US009661598B2

(12) United States Patent
Kim et al.

(10) Patent No.: US 9,661,598 B2
(45) Date of Patent: May 23, 2017

(54) SYSTEM AND METHOD FOR REDUCING INTERFERENCE BETWEEN MULTIPLE TERMINALS

(71) Applicant: Mitsubishi Electric Research Laboratories, Inc., Cambridge, MA (US)

(72) Inventors: Kyeong Jin Kim, Lexington, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/870,205

(22) Filed: Sep. 30, 2015

(65) Prior Publication Data

US 2017/0094630 A1 Mar. 30, 2017

(51) Int. Cl.
*H04W 24/00* (2009.01)
*H04W 60/06* (2009.01)
*H04W 28/16* (2009.01)

(52) U.S. Cl.
CPC ........... *H04W 60/06* (2013.01); *H04W 28/16* (2013.01); *H04W 24/00* (2013.01)

(58) Field of Classification Search
CPC ...... H04W 60/06; H04W 28/16; H04W 24/00
USPC ........................................................ 455/425
See application file for complete search history.

(56) References Cited

U.S. PATENT DOCUMENTS

| 7,680,457 | B2 | 3/2010 | Jin et al. |
| 8,542,763 | B2 | 9/2013 | Forenza et al. |
| 8,644,858 | B2 | 2/2014 | Nagai et al. |
| 8,780,743 | B2 | 7/2014 | Sombrutzki et al. |
| 8,938,246 | B2 | 1/2015 | Cesar et al. |
| 8,995,467 | B2 | 3/2015 | Diachina et al. |
| 2002/0142732 | A1* | 10/2002 | Asano ................... H04L 1/0003 455/73 |
| 2008/0160913 | A1* | 7/2008 | Gardus ................. H04H 20/67 455/18 |
| 2008/0219201 | A1* | 9/2008 | Challapali ............. H04W 24/10 370/312 |
| 2010/0128703 | A1* | 5/2010 | Brand ................... H04W 40/02 370/338 |
| 2012/0051315 | A1 | 3/2012 | Wang |
| 2013/0211706 | A1* | 8/2013 | MacNaughtan ..... G08G 1/0112 701/410 |

(Continued)

FOREIGN PATENT DOCUMENTS

EP 1480386 A2 11/2004

OTHER PUBLICATIONS

Torrieri et al. "The Outage Probability of a finite Ad Hoc Network in Nakagami Fading," IEEE Transactions on Communications, IEEE Service Center, Piscataway, NU. USA. vol. 60, No. 11, Nov. 1, 2012. pp. 3509-3519. XPO11473856.

(Continued)

*Primary Examiner* — Mong-Thuy Tran
(74) *Attorney, Agent, or Firm* — Gene Vinokur; James McAleenan; Hironori Tsukamoto (57) ABSTRACT

A method for communicating a signal from a transmitting terminal to a receiving terminal determines a distance between the receiving terminal and an interfering terminal, commands the interfering terminal to stop its transmission when the distance is less than a threshold and transmits the signal to the receiving terminal.

19 Claims, 9 Drawing Sheets

(56) References Cited

U.S. PATENT DOCUMENTS

| | | | | |
|---|---|---|---|---|
| 2014/0004865 A1* | 1/2014 | Bhargava | ............ | H04W 74/0816 |
| | | | | 455/445 |
| 2015/0181484 A1* | 6/2015 | Bruhn | ................. | H04W 72/082 |
| | | | | 370/329 |
| 2016/0044710 A1* | 2/2016 | Lee | ..................... | H04L 65/4076 |
| | | | | 370/312 |
| 2016/0173805 A1* | 6/2016 | Claus | ................... | H04N 17/004 |
| | | | | 348/148 |

OTHER PUBLICATIONS

Mordachev et al. "On Node Density outage Probability Tradeoff in Wireless Networks," IEEE Journal on Selected Areas in Communication, IEEE Service Center. Piscataway, NJ. USA. vol. 27, No. 7. Sep. 1, 2009. pp. 1120-1131. XPO11275884.

* cited by examiner

| $M$ | $r_{min}$ | Outage probability |
|---|---|---|
| 1 | 0.5 | 0.003 |
| 2 | 0.5 | 0.007 |
| 3 | 0.5 | 0.0122 |
| 4 | 0.5 | 0.0184 |
| 4 | 0.6 | 0.0092 |
| 1 | 0.4 | 0.0075 |

SYSTEM AND METHOD FOR REDUCING INTERFERENCE BETWEEN MULTIPLE TERMINALS

FIELD OF THE INVENTION

The present invention relates generally to wireless communication between transmitting and receiving terminals, and more particularly to communicating a signal in a presence of potentially interfering terminals.

BACKGROUND OF THE INVENTION

In multiuser networks where communication takes place between different terminals there is a need to minimize the detrimental effects of multiple concurrent transmissions. The concurrent transmissions can result in interference that can lead to full or partial failure of the receiving terminal to receive a signal. This problem is even more apparent when the number of interfering terminals can change rapidly, which is possible when the receiving and interfering terminals are moving with respect to each other.

For example, in wireless access in vehicular environments (WAVE), various IEEE standards support communication of a moving vehicle. Intelligent transport systems using such WAVE communication include roadside equipment (hereinafter referred to as "RSE") that is positioned at the roadside and on-board equipment (hereinafter referred to as "OBE") that is arranged in a vehicle and perform vehicle-to-infrastructure (V2I) communications between the OBE and the RSE and vehicle-to-vehicle (V2V) communications between the OBEs.

To continuously provide a communication service under the road conditions to which the intelligent transport system is applied, the transmitting terminals, e.g., base stations, are arranged so that propagation ranges with neighboring base stations may overlap. When the propagation ranges of the base stations do overlap, the base stations use the same frequency as the neighboring base stations to generate interference and communication problems caused by the neighboring base stations.

Additionally and alternatively, transmissions from other interfering terminals, such as vehicles located within a communication range from each other can also interfere with the communication from the base stations. Accordingly, there is a need in the art to provide a system and a method for reducing an interference coming from such interfering vehicles and/or base stations.

SUMMARY OF THE INVENTION

It is an object of some embodiments of an invention to provide a system and a method for reducing interference of concurrently transmitted signals. For example, one signal is transmitted to a receiving terminal and the interfering signal is transmitted to or by an interfering terminal. It is another object of some embodiments, to provide such a system and a method that is suitable for applications when receiving and interfering terminals are moving with respect to each other. For example, the receiving and interfering terminals can be arranged on vehicles supporting vehicle-to-infrastructure (V2I) and/or vehicle-to-vehicle (V2V) communications.

Some embodiments are based on recognition that extent of the interference depends on a distance between a receiving terminal and an interfering terminal, such that as distance decreases the interference increases. Some embodiments of the invention are based on realization that a distance between the receiving and the interfering terminals can be used as an indicator of the undesirable interference. For example, this realization allows determining a threshold governing the potential effect of the interference and preventing the communication of the interfering terminal if the distance between the receiving terminal and the interfering terminal is less than the threshold. For example, one embodiment of the invention commands the interfering terminal to stop its transmission when a distance between the receiving terminal and the interfering terminal is less than a threshold.

Accordingly, one embodiment discloses a method for communicating a signal from a transmitting terminal to a receiving terminal, including determining a distance between the receiving terminal and an interfering terminal; commanding the interfering terminal to stop its transmission when the distance is less than a threshold; and transmitting the signal to the receiving terminal.

Yet another embodiment discloses a transmitting terminal for transmitting a signal to a receiving terminal, including a receiver receiving a location of the receiving terminal and a location of interfering terminal; a processor determining a distance between the receiving terminal and the interfering terminal based on the received locations and for comparing the distance with a threshold; and a transceiver transmitting a command to the interfering terminal to stop its transmission when the distance is less than a threshold, and transmitting the signal to the receiving terminal.

DETAILED DESCRIPTION OF THE PREFERRED EMBODIMENTS

Figure 1:
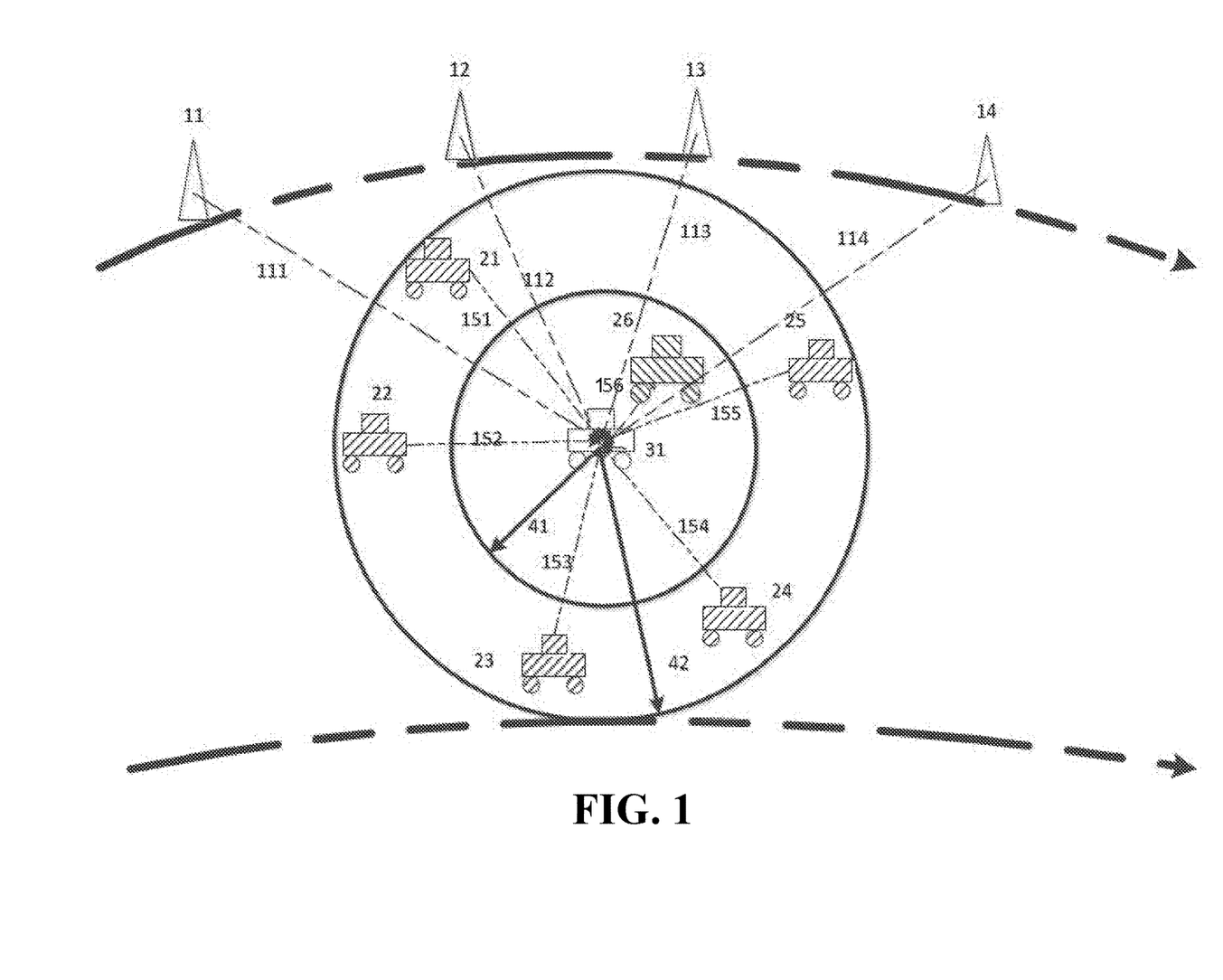
FIG. 1 is a schematic of a system employing principles of some embodiments of the invention.

FIG. 1 shows a schematic of a system employing principles according to some embodiments of the invention. The system 10 includes a number of transmitting terminals, such as base stations 11, 12, 13 and 14 communicating a signal to a receiving terminal 31. The system 10 also include a set of interfering terminals 21, 22, 23, 24, 25 and 26 located within a communication range $r_{max}$ 42 from the receiving terminal 31. In this example, the receiving and the interfering terminals are arranged in vehicles moving with respect to each other.

Some embodiments are based on recognition that extent of the interference depends on a distance between the receiving terminal and the interfering terminal, such that as distance increases the interference decreases. Some embodiments of the invention are based on realization that a distance between the receiving and the interfering terminals can be used as an indicator of the undesirable interference. For example, this realization allows determining a threshold governing the potential effect of the interference and preventing the communication of the interfering terminal if the distance between the receiving terminal and the interfering terminal is less than the threshold.

In different embodiment, the distance between the receiving and the interfering terminals can be determined, e.g., by the transmitting terminal, based on locations of the receiving and the interfering terminals. For example, if the receiving and the interfering terminals are vehicles having positioning systems, such as GPS for determining the locations, the positioning systems can determine and transmit the determined locations to the transmitting terminal for subsequent calculations.

In addition to the GPS system of the vehicle, almost every smart phone includes a GPS receiver capable of determining the position to an accuracy of a few meters. Additionally or alternatively, the position information can be continuously tracked by cellular service providers and can also be transmitted to the transmitting terminal. Given the locations, the distances, such as Euclidean distances 51, 52, 53, 54, 55, and 56 between the receiving and the interfering terminals can be determined.

Some embodiments of the invention determine a threshold distance defining a safety zone around the receiving terminal. The safety zone $r_{min}$ 41 can protect the receiving terminal 31 from critical interference caused from the interfering terminal 26 inside of the safety zone. For example, one embodiment of the invention commands the interfering terminal to stop its transmission when a distance between the receiving terminal and the interfering terminal is less than a threshold. In this example, during the transmission of the signal from one of the base station to the receiving terminal 31, the interfering terminal 26 is commanded to stop its transmission, while the interfering terminals 21-25 are allowed to transmit.

Some embodiments are based on recognition that distance to the receiving terminal can be used as interference parameter because the interference magnitude decreases exponentially with distance according to the equation $$I(d) = I_o d^{-\epsilon},$$

where d is the Euclidean distance between the interfering terminal and the receiving terminal, $I_0$ is a magnitude of the interference originated from the interfering terminal, and $\epsilon$ is the path loss exponent.

For example, channels 111, 112, 113 and 114 are the fading channels between the transmitters 11-14 and the receiving terminal 31. The channels 151, 152, 153, 153 155 and 156 are the fading channels between the interfering terminals 21-26 and the receiving terminal 31. The received signal at the receiving terminal is given by $$y = \Sigma_{k=1}^{K} \sqrt{P} \tilde{h}_k v_k x + \Sigma_{i=1}^{M} \sqrt{P_{I,i}} \tilde{\alpha}_i |g_i| \tilde{x}_i + z,$$

where K is the number of transmitters, P is the transmission power at the transmitters, $\tilde{h}_k \equiv \alpha_k h_k$ denotes a composite channel of the kth transmitter with $\alpha_k$ denoting the path loss over the channel $h_k$. Also, $$v_k \equiv \frac{\tilde{h}_k^*}{\sqrt{\sum_{k'=1}^{K} |\tilde{h}_{k'}|^2}}$$

denotes the beamforming weight being employed at the kth transmitter. The number of interfering terminals in the communication range is specified by M.

The transmission power at the ith interfering terminal and the channel from the ith interfering terminal to the receiving terminal are, respectively, denoted by $P_{I,i}$ and $g_i$, with the path loss over this channel denoted by $\tilde{\alpha}_i$. Also, an additive noise z is distributed by the complex Gaussian process with the zero mean and variance $\sigma_n^2$. Information (x, $\tilde{x}_i$, $\forall i$) transmitted from all terminals has zero means and unit powers, and independent of each other. The fading envelope of $h_k$ is Nakagami-m distributed with the fading parameter $m_k$. Similarly, the fading envelope of $g_i$ is Nakagami-m distributed with the fading parameter $\tilde{m}_i$.

One example of the Nakagami-m distribution is Rayleigh fading distribution. This fading model can cover a general fading channel across two terminals in the system. Fading across $h_k$ and $g_i$ are independent of each other. The path loss component for the channel between the kth transmitter and the receiving terminal is exponentially decaying in distance as $\alpha_k = d_{k,R}^{-\epsilon}$, where $d_{k,R} \in [r_{min}, r_{max}]$ is the distance between the kth transmitter and the receiving terminal and $\epsilon$ is the path loss exponent. Similarly, the path loss component for the channel between the ith interfering terminal and the receiving terminal is also exponentially decaying as $\tilde{\alpha}_i = \tilde{d}_{i,R}^{-\epsilon}$, where $\tilde{d}_{i,R}$ is the distance between the ith interfering terminal and the receiving terminal.

The Nakagami-m fading envelope for $h_k$, $|h_k|^2$ is distributed according to the Gamma distribution, which is denoted by $|h_k|^2 \sim Ga(m_k, n_k)$, where $m_k$ is related to the fading severity and defines the shape of the Gamma distribution, whereas the scale factor, defined by $$n_k = \frac{E\{|h_k|^2\}}{m_k},$$

specifies the average fading power. Similarly, we have $|g_i|^2 \sim Ga(\tilde{m}_i, \tilde{n}_i)$ with $$\tilde{n}_i = \frac{E\{|g_i|^2\}}{\tilde{m}_i}.$$

From the representation of the received signal, the instantaneous signal-to-noise-and-interference ratio (SINR) is defined by $$\lambda \equiv \frac{\sum_{k=1}^{K} \frac{P\alpha_k |h_k|^2}{\sigma_n^2}}{\sum_{i=1}^{M} \frac{P_{I,i}\tilde{\alpha}_i |\tilde{g}_i|^2}{\sigma_n^2} + 1} \equiv \frac{S}{N+1}.$$

In this equation, we define the aggregate received signal power at the receiving terminal as $S \equiv \sum_{k=1}^{K} S_k$, where the kth element of S, $$S_k \equiv \frac{P\alpha_k |h_k|^2}{\sigma_n^2}$$

denotes the normalized instantaneous received signal power through the kth transmitter. We also define the aggregate received noise power at the desired receiver as $N \equiv \sum_{i+1}^{M} N_i$, with $$N_i \equiv \frac{P_{I,i}\tilde{\alpha}_i |\tilde{g}_i|^2}{\sigma_n^2}$$

denoting the normalized received interference power from the ith interfering terminal.

Channel magnitudes for 111-114 follow a Gamma distribution with shape $m_k$ and scale $$\eta_k \equiv \frac{P\alpha_k n_k}{\sigma_n^2}.$$

Similarly, channel magnitudes for 151-155 follow a Gamma distribution with shape $\tilde{m}_i$ and scale $$\tilde{\eta}_i \equiv \frac{P_{I,i}\tilde{\alpha}_i \tilde{n}_i}{\sigma_n^2}.$$

Due to different locations of the transmitters and interfering terminals in general, we have $\eta_k \neq \eta_j, \forall k,j$ with $k \neq j$, and $\tilde{\eta}_k \neq \tilde{\eta}_j, \forall k,j$ with $k \neq j$.

Based on the system configuration including the safety zone and the channel model, the outage probability at a given SINR threshold $\theta$ is given by:

$$\left[ P_{outage}(\theta) = \sum_{k=1}^{K} \sum_{l_1=1}^{K-k+1} \sum_{l_2=l_1+1}^{K-k+2} \cdots \sum_{l_k=l_{k-1}+1}^{K} \sum_{i=1}^{K} \sum_{j=1}^{m_i} \frac{A_{i,j}(-1)^j}{\Gamma(j)} \left( 1 - \right. \right.$$

$$e^{-\frac{\theta}{\eta_i}} \sum_{p=0}^{j-1} \sum_{q=0}^{p} \sum_{\substack{j_1,j_2,\ldots,j_M \\ j_1+j_2+\cdots+j_M=q}} \left( \frac{\theta}{\eta_i} \right)^p \frac{1}{(p-q)!}$$

$$\prod_{t=1}^{M} \frac{1}{j_t!} \frac{\Gamma(j_t+\tilde{m}_t)}{\Gamma(\tilde{m}_t)} \left( \frac{P_{I,t}\tilde{\eta}_t}{\sigma_n^2} \right)^{\tilde{m}_t}$$

$$\left| \frac{2\left(\frac{\theta}{\eta_{l_i}}\right)^{-(j_t+\tilde{m}_t)}}{\epsilon[r_{max}^2 - r_{min}^2]\left(\tilde{m}_t + \frac{2}{\epsilon}\right)} \left[ r_{max}^{\epsilon\tilde{m}_t+2} {}_2F_1\left(\tilde{m}_t + \frac{2}{\epsilon}, j_t + \tilde{m}_t; \tilde{m}_t + \frac{2}{\epsilon} + 1; \right. \right.$$

$$\left. -\frac{r_{max}^{\epsilon}\eta_{l_t}\sigma_n^2}{\theta P_{I,t}\tilde{\eta}_t} \right) - \right]$$

$$\left. r_{min}^{\epsilon\tilde{m}_t+2} {}_2F_1\left(\tilde{m}_t + \frac{2}{\epsilon}, j_t + \tilde{m}_t; \tilde{m}_t + \frac{2}{\epsilon} + 1; -\frac{r_{min}^{\epsilon}\eta_{l_t}\sigma_n^2}{\theta P_{I,t}\tilde{\eta}_t} \right) \right) \right|$$

where $A_{i,j}$ is the constant term specified by the channel factor, $\theta$ is a given threshold which is causing outage, and ${}_2F_1(\cdot)$ denotes the Gauss hypergeometric function.

Figure 2:
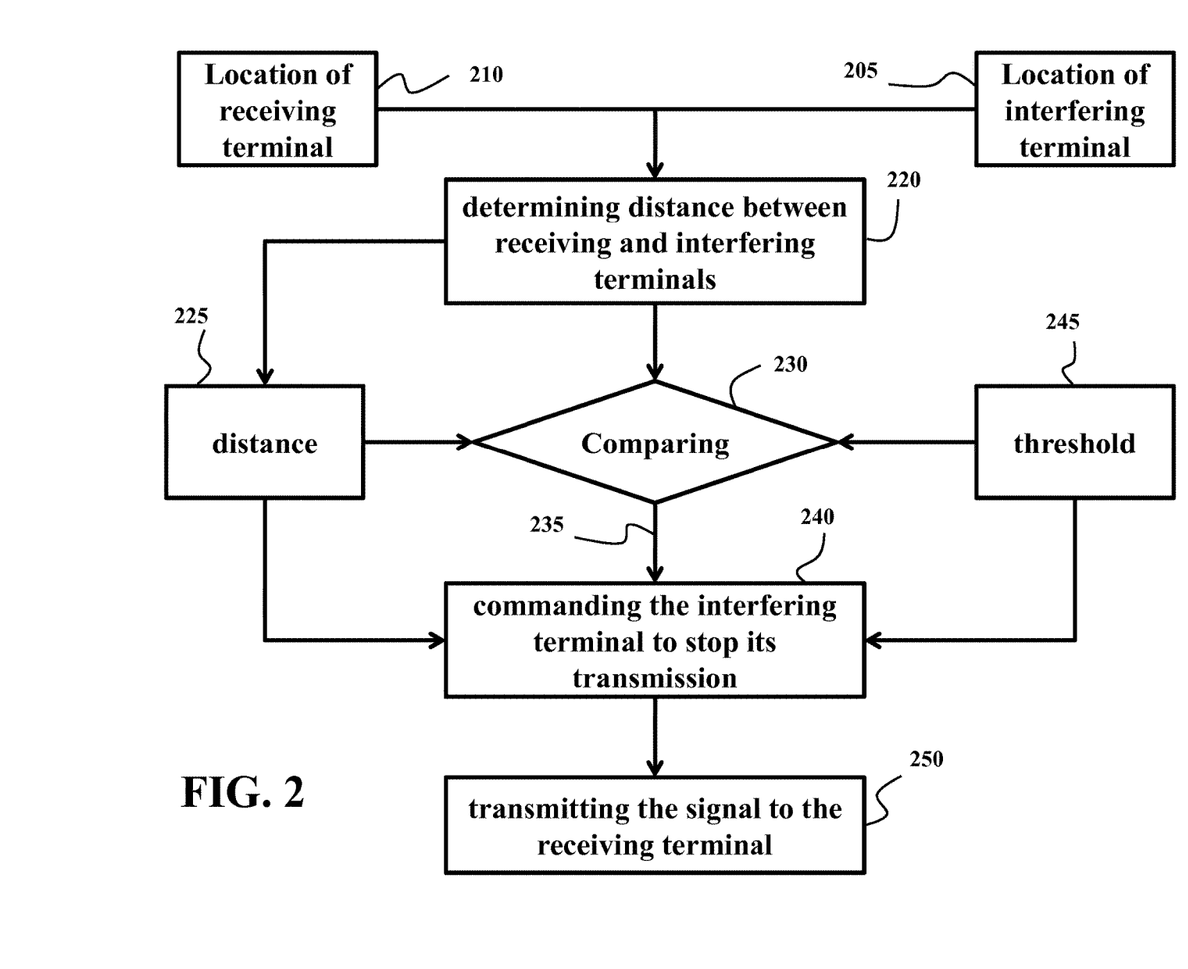
FIG. 2 is a block diagram of a method for communicating a signal from a transmitting terminal to a receiving terminal according to some embodiments of the invention.

FIG. 2 shows a block diagram of a method for communicating a signal from a transmitting terminal to a receiving terminal according to some embodiments of the invention. The method can be performed by a processor of a transmitting terminal having a receiver and a transmitter.

The method determines 220 a distance 225 between the receiving terminal and an interfering terminal based on, e.g., location a location 205 of the interfering terminal and a location 210 of the receiving terminal. Next, the method compares 230 the distance 225 with a threshold 245, commands 240 the interfering terminal to stop its transmission when the distance is less 235 than a threshold and commands to transmit 250 the signal to the receiving terminal. In some embodiments, the method is implemented at the transmitting terminal. In those embodiments, the transmitting terminal transmits, e.g., broadcast or unicast, the command to stop transmission of the interfering terminal and transmits the signal to the receiving terminal using the transceiver and/or antenna of the transmitting terminal.

Some embodiments of the invention determine the threshold based on a quality of service required for communicating the signal. For example, as one criterion of quality of service, one embodiment uses the outage probability to service the receiving terminal with co-existing multiple number of interfering terminals while excluding interfering terminals inside of the safety zone. For a given number of base stations or transmitters and possible number of interfering terminals outside of the safety zone formed around the receiving terminal, some embodiments determine a relationship between values of a distance from the receiving terminal and an outage probability that the receiving terminal fails to receive the signal. For example, this relationship can be expressed as a table for the outage probability for different possible combinations of the number of the transmitters, number of interfering terminals outside of the safety zone, path loss exponent, channel fading parameters, communication range, and size of the safety zone.

Figure 3:
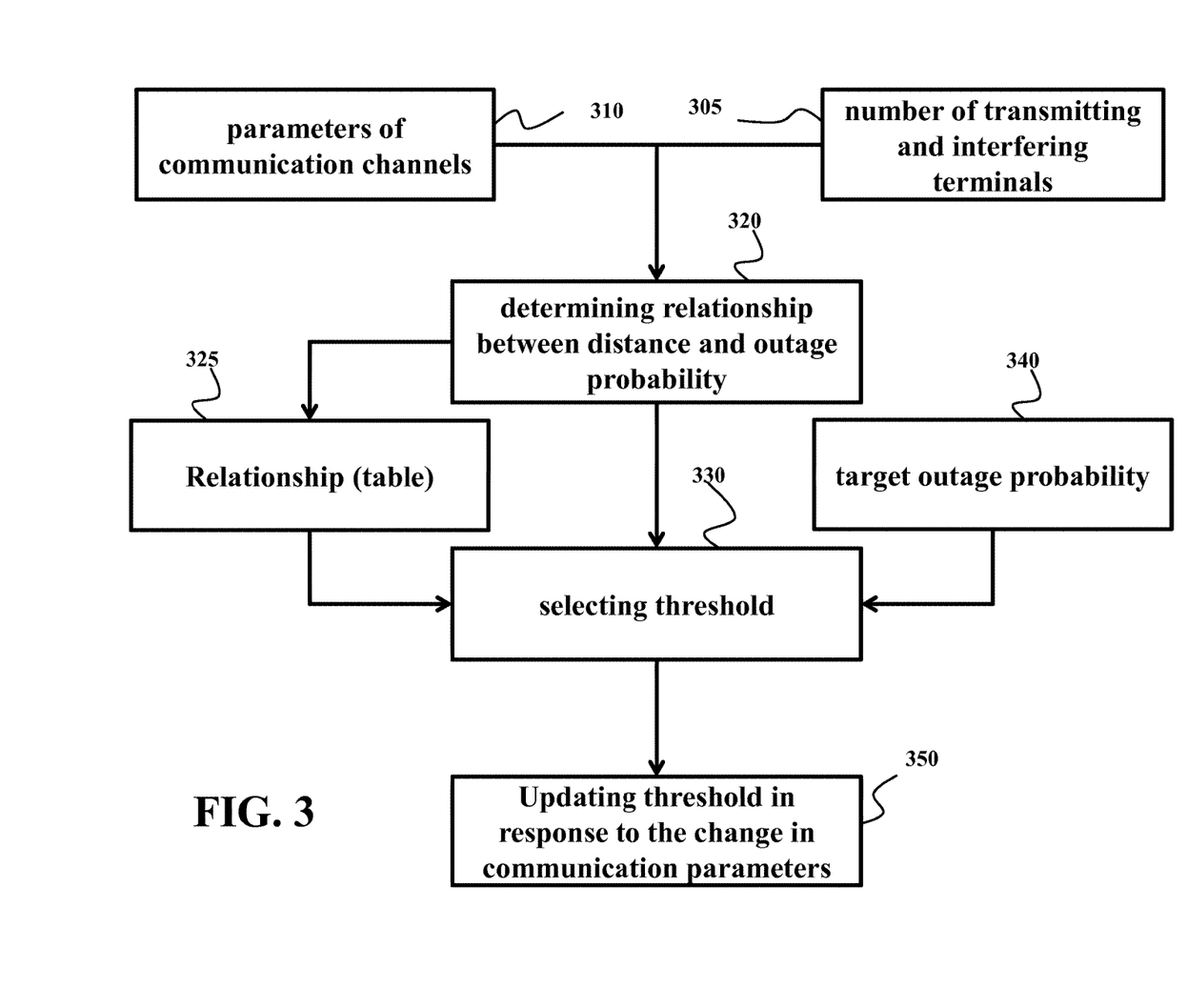
FIG. 3 is a block diagram of a method for determining and/or using a relationship between a number of the interfering terminals within a communication range from the receiving terminal and an outage probability that the receiving terminal fails to receive the signal according to one embodiments of the invention.

FIG. 3 shows a block diagram of a method for determining and/or using the abovementioned relationship according to one embodiments of the invention. For example, the relationship between values of a distance from the receiving terminal and an outage probability that the receiving terminal fails to receive the signal can be determined 320 based on parameters of communication including one or combination of a number of the transmitting terminals and a number of the interfering terminals 305 within a communication range from the receiving terminal and parameters of communication channels 310 between the transmitting terminals and the receiving terminal.

For example, one embodiment determines the relationship using the Equation for outage probability $P_{outage}(\theta)$, with numerous different combinations of parameters of communication channels, e.g., system configuration parameters and channel fading parameters. For example, one embodiment uses combinations of different values for the number of transmitting K and interfering M terminals, a size, i.e., the distance from the receiving terminal, of the safety zone $r_{min}$, the communication range $r_{max}$ for the receiving terminal, maximum transmission power at the interfering terminals $\{P_{I,t}, \forall t\}$, path loss exponent $\epsilon$ of the communication channels, channel fading parameters $\{m_i, \forall i\}$ and $\{\tilde{m}_t, \forall t\}$.

Figure 4:
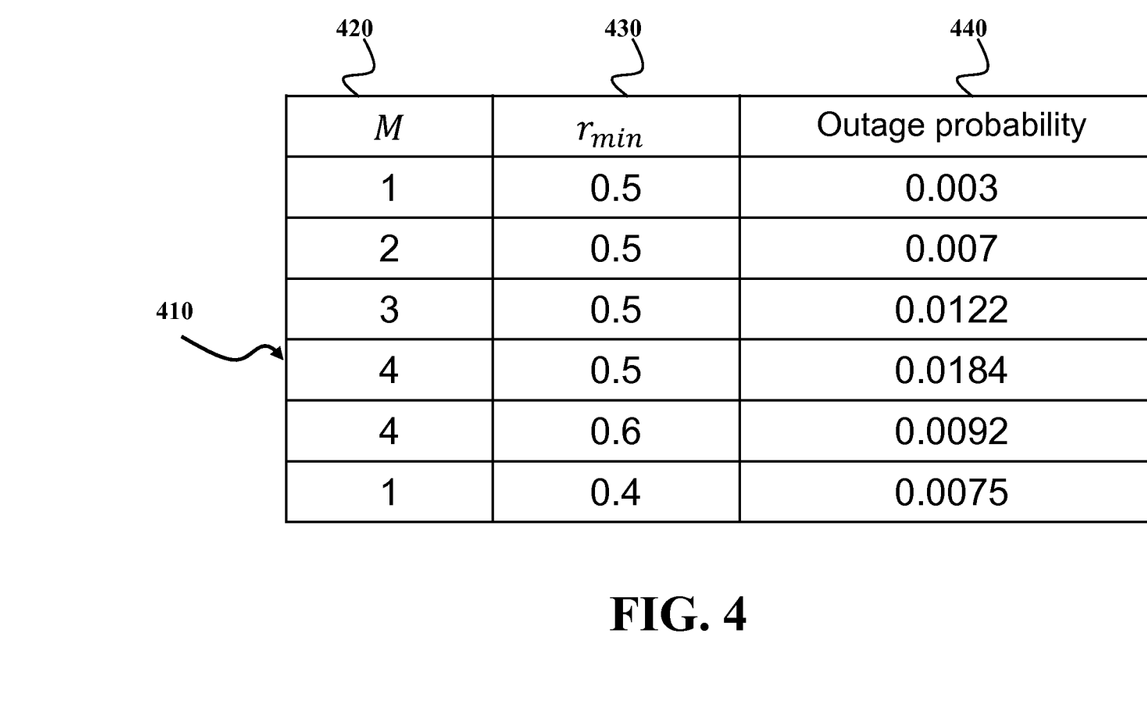
FIG. 4 is an example of the relationship expressed as a table.

FIG. 4 shows an example of the relationship expressed as a table 410. In this example $$K = 4, \ r_{max} = 1, \ P_{I,t} = 0.1, \ \forall \ t, \ \epsilon = 4, \ \{m_i = 1, \ \forall \ i\}, \ \frac{P}{\sigma_n^2} = 15 \ dB,$$

and $\{\tilde{m}_t=1, \forall t\}$, however, the table 410 can be readily extended including different combinations of these parameters. In this example, the table 410 relates the threshold distance 430 around the receiving terminal with the target outage probability 440 as a function of a number M 420 of interfering terminals within the communication range from the receiving terminal but outside of the safety zone.

Using this table and/or other relationships, some embodiments can select 330 the threshold as a distance corresponding to a target outage probability according to the determined relationship. For example, similar relationship can be determined between a number of the interfering terminals within a communication range from the receiving terminal and an outage probability that the receiving terminal fails to receive the signal.

In addition, some embodiments are configured for updating 350 the threshold in response to detecting the change in at least one parameter of communication. For example, the embodiments can detect the change in a number of interfering terminals within the communication range from the receiving terminal. This situation is possible when the interfering and/or receiving terminals are mobile. Additionally or alternatively, the change can be detected for the target outage probability and/or other parameters of the communication channels.

Accordingly, one embodiment of the invention determines the safety zone adaptively by searching the relationship for the threshold distances corresponding to the current number of interfering terminals and the target outage probability. Additionally or alternatively, one embodiment can command a distant terminal located at a distance greater that the threshold from the receiving terminal to stop its transmission. This embodiment allows flexibility for selecting the interfering terminal needed to stop its transmission.

Figure 5:
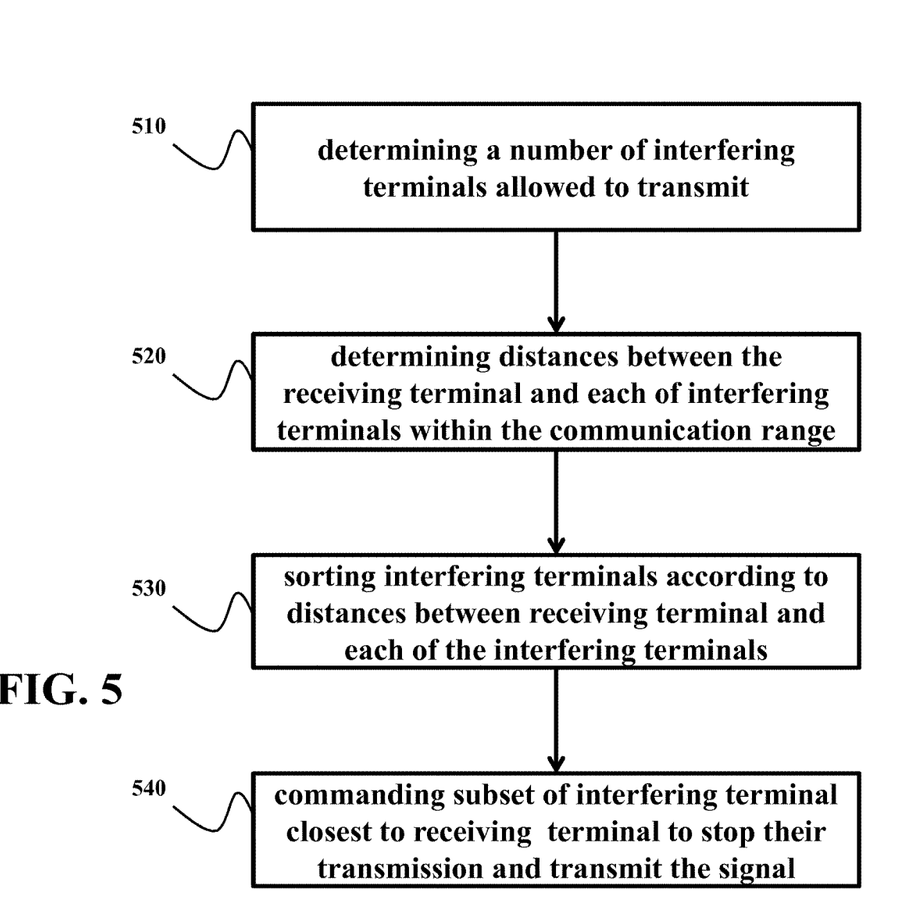
FIG. 5 is a flow chart of a method for communicating the signal to receiving terminal according to one embodiment of the invention.

FIG. 5 shows a flow chart of a method for communicating the signal to receiving terminal according to one embodiment of the invention. The method determines 510 a number of interfering terminals allowed to transmit for a target outage probability using a relationship between the number of the interfering terminals within a communication range from the receiving terminal and an outage probability that the receiving terminal fails to receive the signal, and commands 540 to allow only the number of interfering terminals to transmit while transmitting the signal to the receiving terminal.

For example, the method can determine 520 the distances between the receiving terminal and each of interfering terminals within the communication range based on locations of the receiving and the interfering terminals and sort 530 the interfering terminals according to the distances between the receiving terminal and each of the interfering terminals and commands 540 to a subset of interfering terminal closest to the receiving terminal according to the sorted interfering terminals to stop their transmission to have only the number of interfering terminals allowed to transmit concurrently with transmitting the signal to the receiving terminal.

For example, the method determines that for the target outage probability only five interfering terminals can transmit concurrently with the transmitting the signal by the transmitting terminal. However, the method determines that there are seven interfering terminals within the communication range from the receiving terminals. Accordingly, in that example, two interfering terminal are requested to stop their transmission, while five other interfering terminals are allowed to transmit. For example, the two interfering terminals closest to the receiving terminal can be commanded to stop their transmission.

Figure 6:
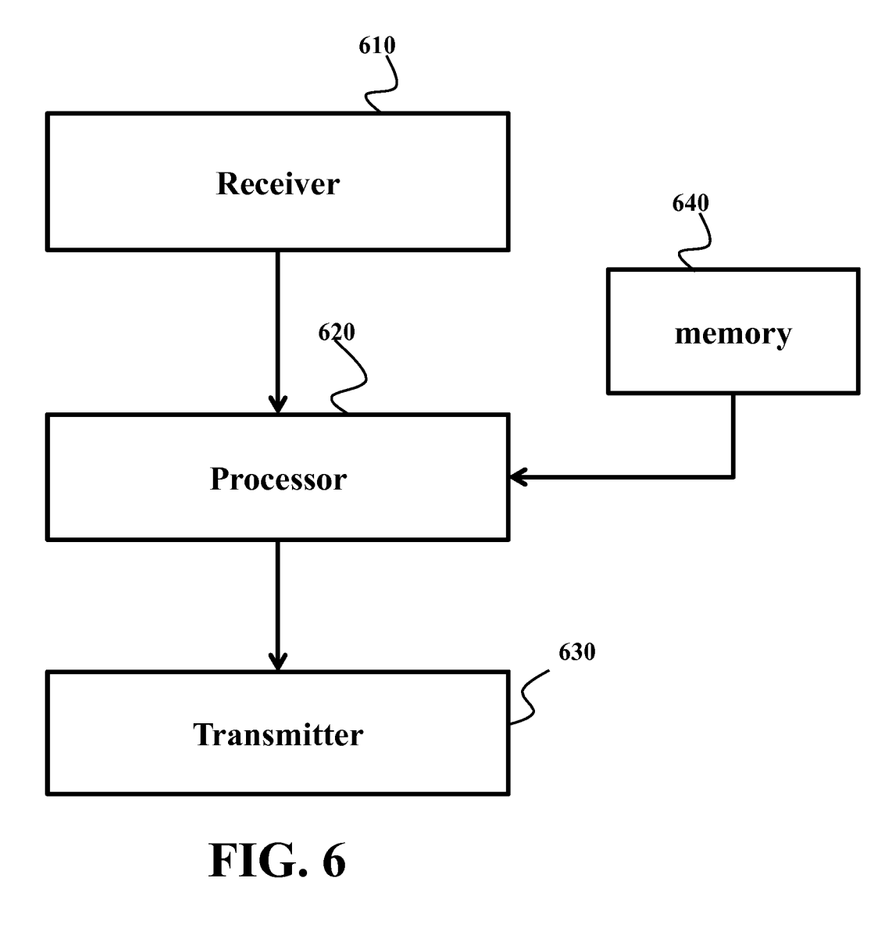
FIG. 6 is a block diagram of a transmitting terminal for transmitting a signal to a receiving terminal according to some embodiments of the invention.

FIG. 6 shows a block diagram of a transmitting terminal for transmitting a signal to a receiving terminal according to some embodiments of the invention. The transmitting terminal includes a receiver 610 configured for receiving a location of the receiving terminal and a location of interfering terminal, a processor 620 configured for determining a distance between the receiving terminal and the interfering terminal based on the received locations and for comparing the distance with a threshold and a transmitter 630 configured for transmitting a command to the interfering terminal to stop its transmission when the distance is less than a threshold, and for transmitting the signal to the receiving terminal. The transmitting terminal can also include a memory 640 storing a relationship between a number of the interfering terminals within a communication range from the receiving terminal and an outage probability that the receiving terminal fails to receive the signal. The processor determines the threshold according to the relationship.

The transmission of the signal to the receiving terminal can be done sequentially and concurrently with the transmission of the command to stop the transmission to the interfering terminal. In some embodiments, the signal transmission and the commanding are performed substantially concurrently according to specifics of one or combination of a time, a frequency, and a code division multiple access transmission.

For example, in time division multiple access (TDMA), the signal is divided into different time slots, so that multiple users (terminals) can share the same frequency band by applying user (terminal) scheduling in accessing the time slots. In contrast to TDMA, frequency division multiple access (FDMA) allows the terminals to use the allocated frequency band at all times when this channel (frequency band) is available. Code division multiple access (CDMA) uses a spread spectrum that spreads information for all terminals throughout the whole allocated frequency band. By de-spreading the received signal, a desirable terminal can be selected. Another widely used method in multiple accesses is carrier sense multiple access (CSMA), which allows multiple terminals to access the single transmission channel.

Figure 7:
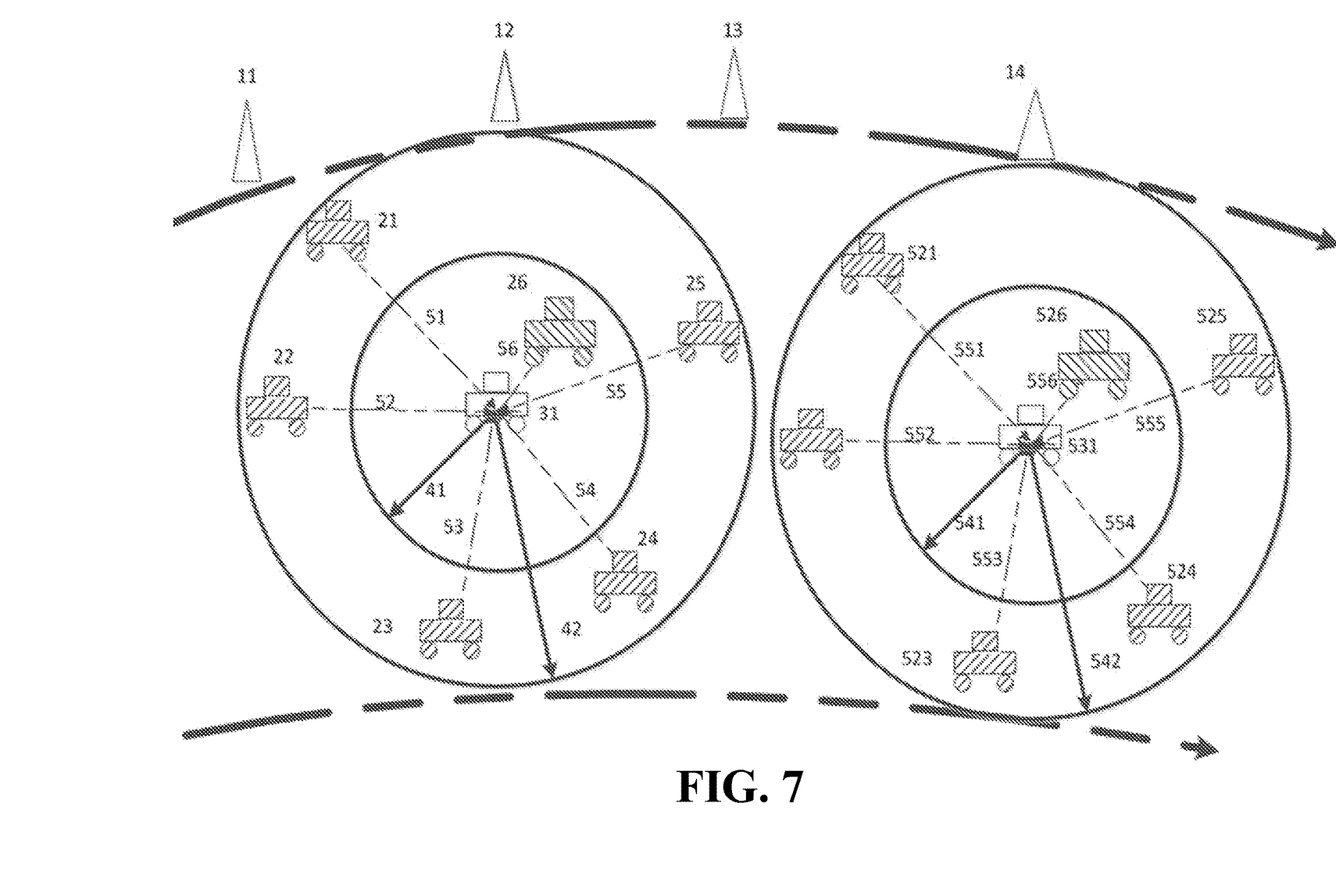
FIG. 7 is a schematic of an exemplar system employing some embodiments of the invention.

FIG. 7 shows a schematic of an exemplar system employing some embodiments of the invention. In this example, there are two communication ranges for two receiving terminals, 31 and 531. The system includes a number of transmitting terminals, such as base stations 11, 12, 13 and 14 communicating a signal to a receiving terminal 31 and 531. In addition to the interfering terminals within the communication range from the receiving terminal 31, the system also include a set of interfering terminals 521, 522, 523, 524, 525 and 526 located within a communication range 542 from the receiving terminal 531. Each receiving terminal can have unique set of interfering terminals within the corresponding communication range. Alternatively, at least some interfering terminal can be located with communication ranges of both receiving terminals.

For the second receiving terminal 531 another safety zone 541 is formed. The threshold distance 541 can be different from the distance 41 due to a different requirement of quality of service. Various embodiments employ different methods described above to meet the required outage probability for different receiving terminals. Because two communication ranges exist at the same time for the communication operation, the interference from the terminals serviced from different communication range is intrinsic. Thus, more detrimental multiple/simultaneous transmissions can be present.

Figure 8:
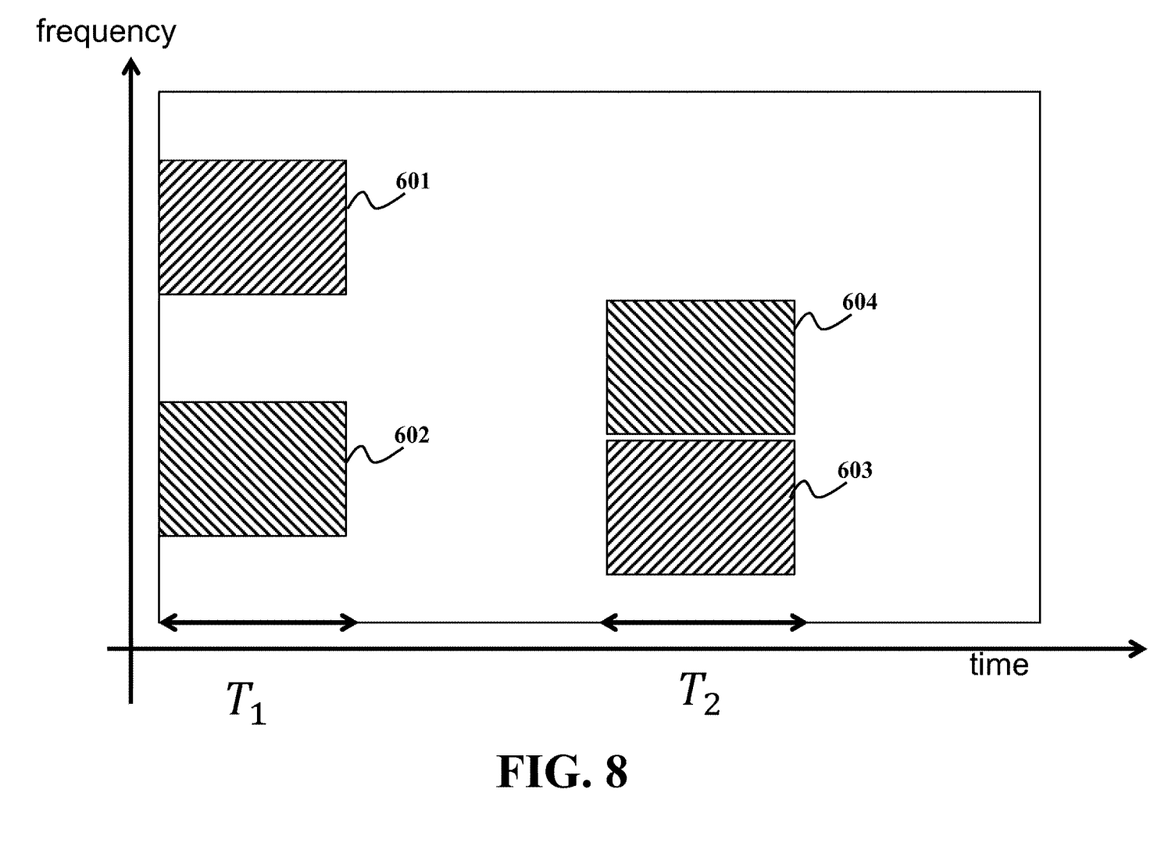
FIG. 8 is one example of forming non-overlapping resource blocks to avoid an intra-range-interference according one embodiment of the invention.

FIG. 8 shows one example of forming non-overlapping resource blocks to avoid this intra-range-interference according one embodiment of the invention. In this embodiment, orthogonal resource blocks in the frequency are used. For example, in time interval $T_1$ in FIG. 8, the resource block 801 is used for the communication with the terminal 31, while the resource block 802 is used for the communication with the terminal 531. A different time interval, $T_2$, a different set of resource blocks, 803 and 804, can be used to form non-overlapping resource blocks.

Figure 9:
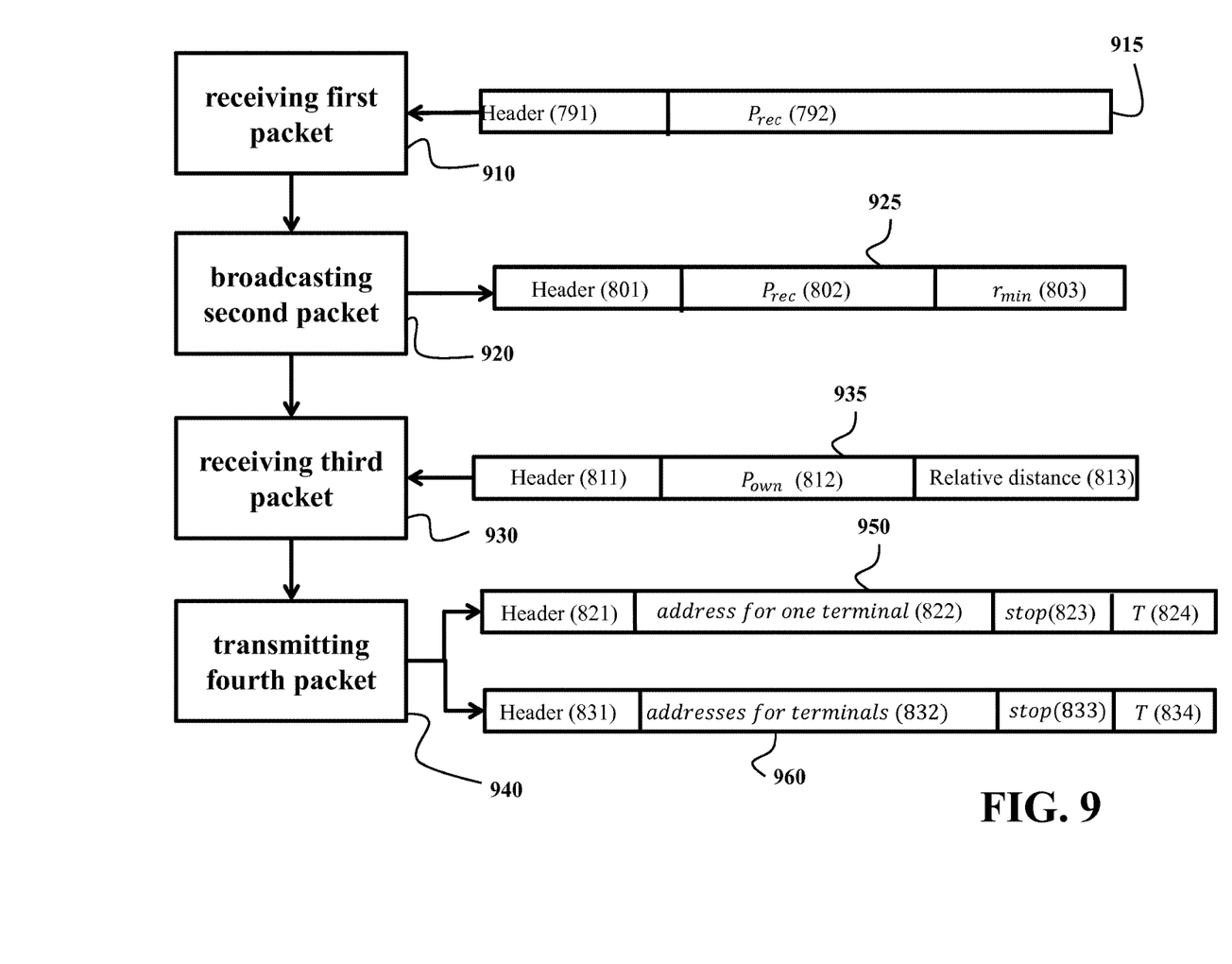
FIG. 9 is a block diagram of a protocol for determining and transmitting the command to either to stop or continue the transmission according to one embodiment of the invention.

FIG. 9 shows a block diagram of a protocol for determining and transmitting the command to either to stop the transmission or continue the transmission by the interfering terminal according to one embodiment of the invention. The transmitting terminal receives 910 a request for a safety zone from the receiving terminal via a first packet 915 including a header 791 and a location of the receiving terminal 792. Next, the transmitting terminal broadcasts 920, to a set of interfering terminals, a second packet 925 including a header 801, the location of the receiving terminal 802 and the threshold distance 803 from the receiving terminal.

After receiving the broadcasted second packet, each interfering terminal reports its relative position with respect to the receiving terminal. For example, the transmitting terminal receives 930, from each interfering terminal in the set, a third packet 935 specifying a header 821, a location of corresponding interfering terminal 812 and a distance 813 between the corresponding interfering terminal and the receiving terminal. Next, the transmitting terminal transmits 940, to at least some interfering terminal in the set, a fourth packet 950 and/or 960 specifying address of the corresponding interfering terminal, a command to either to stop the transmission or continue the transmission, a period of time for stopping the transmission.

For example, in one embodiment, the transmitting 940 includes a unicast transmission of the forth packet 950 to the interfering terminal. In this embodiment, the fourth packet includes a header 821, the address of the interfering terminal 822, a command 823 and the period of time 824. Additionally or alternatively, one embodiment broadcasts 940 the forth packet 960 to a multiple interfering terminals. In this embodiment, the fourth packet includes a header 831, the addresses of the interfering terminals 832, the command 833 and the period of time 834.

After receiving the broadcasting packet 800, each node reports its relative position with respect to the desired receiver 780 via an updating packet 810 consisting of the header 811, the field 812 providing its position, and the field 813 providing a relative distance with respect to the receiver.

Then, after receiving all the packets from the nodes, the AP broadcast a controlling packet 830 to the all node indicating whether they can communicate or not. For the broadcasting, the controlling packet consists of the header 831, the field 832 providing addresses for the nodes in the communication range of the receiver, the field 833 providing corresponding activity (quiet or send) of the nodes, and the field 834 providing the time of duration of the safety zone.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for communicating a signal from a transmitting terminal to a receiving terminal, comprising:
   receiving a request for a safety zone from the receiving terminal via a first packet including a location of the receiving terminal;
   broadcasting to a set of interfering terminals a second packet including the location of the receiving terminal and a threshold distance from the receiving terminal;
   determining a distance between the receiving terminal and an interfering terminal, comprising:
      receiving, from each interfering terminal in the set, a third packet specifying location of corresponding interfering terminal and a distance between the corresponding interfering terminal and the receiving terminal;
   commanding the interfering terminal to stop its transmission when the distance is less than the threshold, comprising:
      transmitting, to at least some interfering terminal in the set, a fourth packet specifying address of the corresponding interfering terminal, a command to either to stop the transmission or continue the transmission, and a period of time for stopping the transmission; and transmitting the signal to the receiving terminal.

2. The method of claim 1, further comprising:
determining the threshold based on a quality of service required for communicating the signal; and
comparing the distance with the threshold.

3. The method of claim 1, further comprising:
determining a relationship between values of a distance from the receiving terminal and an outage probability that the receiving terminal fails to receive the signal, wherein the relationship is determined based on parameters of communication including one or combination of a number of the transmitting terminals and a number of the interfering terminals within a communication range from the receiving terminal and parameters of communication channels between the transmitting terminals and the receiving terminal; and
selecting the threshold as a distance corresponding to a target outage probability according to the determined relationship.

4. The method of claim 3, further comprising:
detecting a change in at least one parameter of communication; and
updating the threshold in response to detecting the change.

5. The method of claim 3, further comprising:
detecting a change in at least one parameter of communication;
selecting a distant terminal from a subset of interfering terminals located at distances from the receiving terminal greater than the threshold; and
commanding the distant terminal to stop its transmission.

6. The method of claim 1, wherein the receiving terminal and the interfering terminal are moving with respect to each other, further comprising:
determining locations of the interfering terminal and the receiving terminal; and
determining the distance between the interfering terminal and the receiving terminal as a Euclidean distance between the locations.

7. The method of claim 6, wherein the interfering terminal and the receiving terminal are vehicles having positioning systems for determining the locations.

8. The method of claim 1, wherein the transmitting terminal commands the interfering terminal to stop its transmission substantially concurrently with transmitting the signal to the receiving terminal using one or combination of a time, a frequency, and a code division multiple access.

9. The method of claim 1, further comprising:
determining a number of interfering terminals allowed to transmit for a target outage probability of the receiving terminal failing to receive the signal using a relationship between the number of the interfering terminals within a communication range from the receiving terminal and an outage probability that the receiving terminal fails to receive the signal; and
commanding to allow only the number of interfering terminals to transmit while transmitting the signal to the receiving terminal.

10. The method of claim 9, further comprising:
determining distances between the receiving terminal and each of interfering terminals within the communication range based on locations of the receiving and the interfering terminals;
sorting the interfering terminals according to the distances between the receiving terminal and each of the interfering terminals; and
commanding to a subset of interfering terminal closest to the receiving terminal according to the sorted interfering terminals to stop their transmission to have only the number of interfering terminals allowed to transmit concurrently with transmitting the signal to the receiving terminal.

11. The method of claim 1, wherein the transmitting includes a unicast transmission to the interfering terminal.

12. A transmitting terminal for transmitting a signal to a receiving terminal, comprising:
a receiver receiving a location of the receiving terminal and a location of interfering terminal;
a processor determining a distance between the receiving terminal and the interfering terminal based on the received locations and for comparing the distance with a threshold; and
a transceiver transmitting a command to the interfering terminal to stop its transmission when the distance is less than a threshold, and transmitting the signal to the receiving terminal, wherein the processor is configured for determining a current outage probability of the receiving terminal failing to receive the signal based on a set of interfering terminals within a communication range from the receiving terminal, configured for determining the distances between the receiving terminal and each of the interfering terminals based on locations of the receiving and the interfering terminals, configured for determining a number of interfering terminals allowed to transmit for a target probability of the receiving terminal failing to receive the signal, and configured for reducing a size of the set of interfering terminals till the number by allowing only the number of interfering terminals to transmit while transmitting the signal to the receiving terminal.

13. The transmitting terminal of claim 12, further comprising:
a memory storing a relationship between a number of the interfering terminals within a communication range from the receiving terminal and an outage probability that the receiving terminal fails to receive the signal, wherein the processor determines the threshold according to the relationship.

14. The transmitting terminal of claim 13, wherein the relationship is determined based on parameters of communication including one or combination of a number of the transmitting terminals and a number of the interfering terminals within a communication range from the receiving terminal and parameters of communication channels between the transmitting terminals and the receiving terminal, and wherein the processor determines the threshold as a distance corresponding to a target outage probability according to the relationship.

15. The transmitting terminal of claim 13, wherein the processor updates the threshold in response to detecting a change in at least one parameter of communication.

16. The transmitting terminal of claim 12, wherein the interfering terminal and the receiving terminal are vehicles having positioning systems for determining the locations.

17. The transmitting terminal of claim 12, wherein the transceiver receives a request for a safety zone from the receiving terminal via a first packet including a location of the receiving terminal;

broadcasts to a set of interfering terminals a second packet including the location of the receiving terminal and the threshold distance from the receiving terminal;

receives, from each interfering terminal in the set, a third packet specifying location of corresponding interfering terminal and a distance between the corresponding interfering terminal and the receiving terminal; and transmits, to at least some interfering terminal in the set, a fourth packet specifying address of the corresponding interfering terminal, a command to either to stop the transmission or continue the transmission, a period of time for stopping the transmission.

18. A method for communicating a signal from a transmitting terminal to a receiving terminal, comprising:

determining a number of interfering terminals allowed to transmit for a target outage probability of the receiving terminal failing to receive the signal using a relationship between the number of the interfering terminals within a communication range from the receiving terminal and an outage probability that the receiving terminal fails to receive the signal;

determining distances between the receiving terminal and each of interfering terminals within the communication range based on locations of the receiving and the interfering terminals;

sorting the interfering terminals according to the distances between the receiving terminal and each of the interfering terminals; and commanding to a subset of interfering terminal closest to the receiving terminal according to the sorted interfering terminals to stop their transmission to have only the number of interfering terminals allowed to transmit concurrently with transmitting the signal to the receiving terminal, including commanding the interfering terminal to stop its transmission when the distance is less than a threshold; and commanding to allow only the number of interfering terminals to transmit while transmitting the signal to the receiving terminal; and transmitting the signal to the receiving terminal.

19. A transmitting terminal for transmitting a signal to a receiving terminal, comprising:

a receiver receiving a location of the receiving terminal and a location of interfering terminal;

a processor determining a distance between the receiving terminal and the interfering terminal based on the received locations and for comparing the distance with a threshold; and a transceiver transmitting a command to the interfering terminal to stop its transmission when the distance is less than a threshold, and transmitting the signal to the receiving terminal, wherein the transceiver receives a request for a safety zone from the receiving terminal via a first packet including a location of the receiving terminal;

broadcasts to a set of interfering terminals a second packet including the location of the receiving terminal and the threshold distance from the receiving terminal;

receives, from each interfering terminal in the set, a third packet specifying location of corresponding interfering terminal and a distance between the corresponding interfering terminal and the receiving terminal; and transmits, to at least some interfering terminal in the set, a fourth packet specifying address of the corresponding interfering terminal, a command to either to stop the transmission or continue the transmission, a period of time for stopping the transmission.

* * * * *